United States Patent [19]

Shimura

[11] Patent Number: 5,068,745
[45] Date of Patent: Nov. 26, 1991

[54] IMAGE FILING METHOD

[75] Inventor: Kazuo Shimura, Kanagawa, Japan

[73] Assignee: Fuji Photo Film Co., Ltd., Kanagawa, Japan

[21] Appl. No.: 501,221

[22] Filed: Mar. 29, 1990

[30] Foreign Application Priority Data

Apr. 3, 1989 [JP] Japan .................................. 1-84308

[51] Int. Cl.$^5$ ............................................. H04N 1/00
[52] U.S. Cl. ................................... 358/403; 358/426; 358/444
[58] Field of Search ............... 358/426, 403, 404, 444, 358/261.4

[56] References Cited

U.S. PATENT DOCUMENTS

| 4,264,808 | 4/1981 | Owens et al. | 358/403 |
| 4,303,948 | 12/1981 | Arai et al. | 358/444 |
| 4,587,633 | 5/1986 | Wang et al. | 358/403 |
| 4,591,997 | 5/1986 | Grabel | 358/444 |

Primary Examiner—Edward L. Coles, Sr.
Attorney, Agent, or Firm—Sughrue, Mion, Zinn, Macpeak & Seas

[57] ABSTRACT

Image signals are subjected to a first signal compression processing which is carried out with a small factor of compression. The compressed image signals, which are obtained from the first signal compression processing, are recorded on a first recording medium. When a predetermined period has elapsed after a compressed image signal obtained from the first signal compression processing was recorded on the first recording medium, or when the frequency with which the compressed image signal is read from the first recording medium has become lower than a predetermined value, the compressed image signal is read out from the first recording medium. The image signal, which has been read out from the first recording medium, is subjected to a second signal compression processing which is carried out with a large factor of compression. The compressed image signal, which is obtained from the second signal compression processing, is recorded on a second recording medium. Thereafter, the compressed image signal, for which the predetermined period has elapsed after it was recorded on the first recording medium or for which the frequency has become lower than the predetermined value, is erased from the first recording medium.

11 Claims, 2 Drawing Sheets

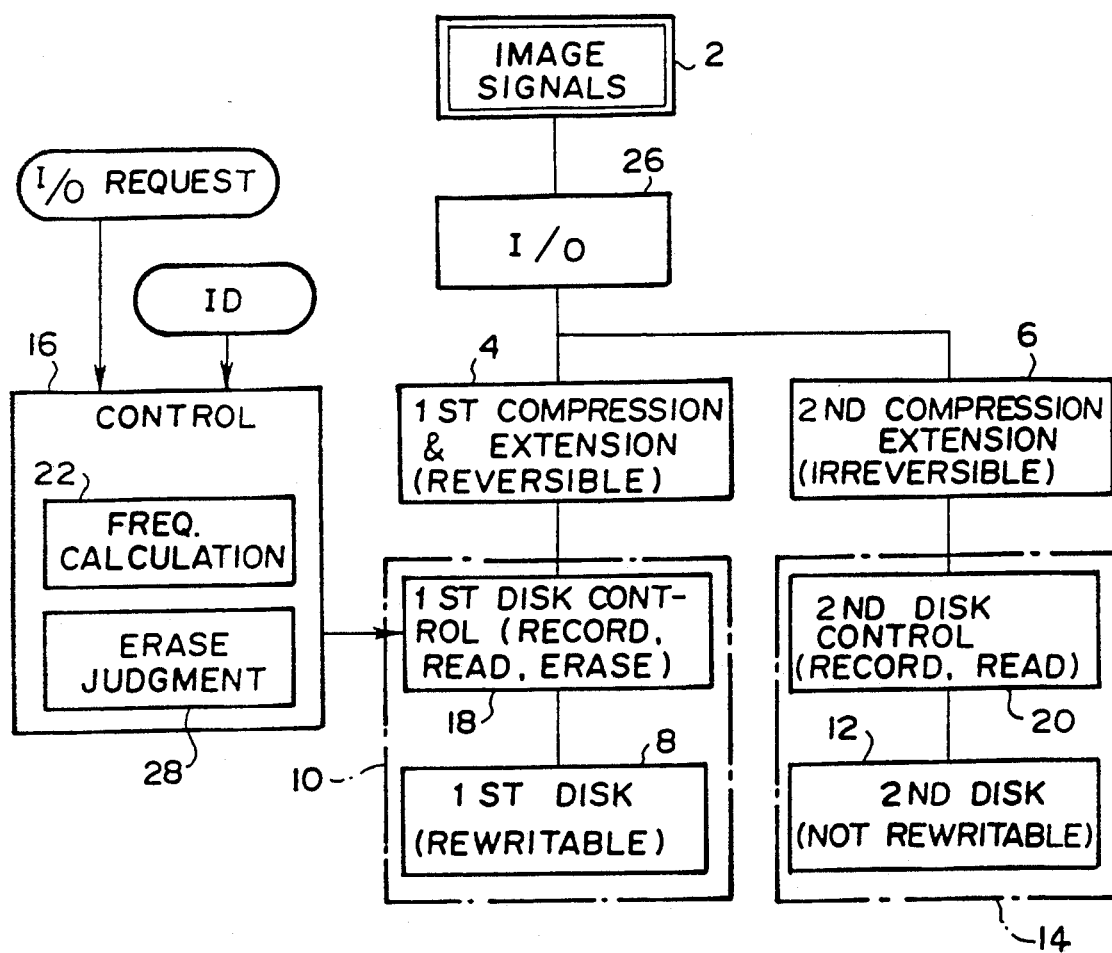

IMAGE FILING METHOD

BACKGROUND OF THE INVENTION

1. Field of the Invention

This invention relates to an image filing method for compressing image signals, thereby reducing their amount, and recording the compressed image signals on a recording medium, such as an optical disk.

2. Description of the Prior Art

In recent years, image filing systems have been put into practice. With the image filing systems, image signals representing medical images having gradation, or the like are recorded in the form of digital signals on recording media, such as optical disks. When necessary, the recorded image signals are read from the recording media and used in reproduction of visible images on a CRT device, or the like.

In the image filing systems, image signal compression and extension techniques have heretofore been used widely for the purposes of reducing the number of recording media which are stored. With the image signal compression and extension techniques, image signals are compressed and their amount is reduced. Thereafter, the compressed image signals are recorded on recording media. When images are to be reproduced from the image signals, the compressed image signals are read from the recording media and subjected to an image signal extension processing. The image signals thus extended are then used in the reproduction of visible images.

The conventional image filing systems described above utilize optical disks, on which the signals cannot be rewritten, as the recording media. Therefore, the mode in which an image signal is compressed is set when the compressed image signal is originally recorded on an optical disk. After the image signal is compressed in the set mode and the compressed image signal is recorded on an optical disk, the optical disk is kept with the originally compressed image signal stored thereon until the compressed image signal becomes unnecessary.

In general, in cases where an image signal is compressed with a large factor of compression, the image quality of a visible image reproduced from the compressed image signal is very bad. In cases where an image signal is compressed with a small factor of compression, the image quality of a visible image reproduced from the compressed image signal does not become very bad.

Therefore, with the conventional image filing systems described above wherein an image signal compressed with an originally set signal compression processing is kept stored on a recording medium until it becomes unnecessary, the problems described below occurs. Specifically when a signal compression processing is carried out on an image signal with a large factor of compression in order to reduce the number of recording media which are to be stored, the problem occurs in that the image quality of a visible image reproduced from the compressed image signal is very bad. When the image quality of a visible image reproduced from a compressed image signal is to be kept good, the problem occurs in that the factor of compression of the image signal cannot be kept large. Therefore, it is difficult to file image signals efficiently.

SUMMARY OF THE INVENTION

The primary object of the present invention is to provide an image filing method wherein image signals are filed so that the image quality of a visible image reproduced from a compressed image signal is kept good, and the factor of compression of an image signal is kept large.

Another object of the present invention is to provide an image filing method which enables image signals to be filed efficiently.

The present invention provides a first image filing method comprising the steps of:

i) subjecting original image signals to a first signal compression processing which is carried out with a small factor of compression, ii) recording the compressed image signals, which are obtained from said first signal compression processing, on a first recording medium, iii) when a predetermined period has elapsed after a compressed image signal obtained from said first signal compression processing was recorded on said first recording medium, or when the frequency with which said compressed image signal is read from said first recording medium has become lower than a predetermined value, reading out said compressed image signal from said first recording medium, iv) subjecting the image signal, which has been read out from said first recording medium, to a second signal compression processing which is carried out with a large factor of compression, v) recording the compressed image signal, which is obtained from said second signal compression processing, on a second recording medium, and vi) thereafter erasing said compressed image signal, for which said predetermined period has elapsed after it was recorded on said first recording medium or for which said frequency has become lower than said predetermined value, from said first recording medium.

The present invention also provides a second image filing method comprising the steps of:

i) subjecting original image signals to a first signal compression processing which is carried out with a small factor of compression, ii) recording the compressed image signals, which are obtained from said first signal compression processing, on a first recording medium, iii) subjecting said original image signals to a second signal compression processing which is carried out with a large factor of compression, iv) recording the compressed image signals, which are obtained from said second signal compression processing, on a second recording medium, and v) when a predetermined period has elapsed after a compressed image signal obtained from said first signal compression processing was recorded on said first recording medium, or when the frequency with which said compressed image signal is read from said first recording medium has become lower than a predetermined value, erasing said compressed image signal from said first recording medium.

The term "small factor of compression" as used herein means a factor of compression which is smaller than that used during the second signal compression processing. The term "large factor of compression" as used herein means a factor of compression which is larger than that used during the first signal compression processing. Also, the term "compression processing carried out with a small factor of compression" as used herein is equivalent to reversible compression processing or an irreversible compression processing which causes little deterioration to occur in the image quality of a visible image reproduced from a compressed image signal.

The first recording medium should preferably be a recording medium on which image signals can be rewritten, for example, an optical disk on which image signals can be rewritten, a magneto-optical disk, or a magnetic disk. It is sufficient for the second recording medium to be recording medium on which image signals cannot be rewritten. Alternatively, a recording medium on which image signals can be rewritten may be employed as the second recording medium. In cases where a recording medium on which image signals cannot be rewritten is employed as the first recording medium, the erasing of image signals from the first recording medium is equivalent to the discarding of the first recording medium.

In general, in cases where an image signal is kept stored on a recording medium for a considerable period of time, within a certain initial part of the period, the image signal is comparatively frequently read out from the recording medium and used in reproducing a visible image, and the image quality of the visible image reproduced from the image signal is required to be as good as possible. After the initial part of the period has elapsed, the frequency with which the image signal is read out from the recording medium becomes very low, and the image quality of the visible image reproduced from the image signal is not required to be very good.

For example, in cases where an image signal representing a medical image of an affected part is kept stored on a recording medium, before treatment of the affected part is finished, the image signal is frequently read out from the recording medium, and the image quality of a visible image reproduced from the image signal is required to be as good as possible. After treatment of the affected part is finished, the image signal is scarcely read out from the recording medium, and the image quality of the visible image reproduced from the image signal is not required to be very good.

Therefore, it is only necessary that, within a predetermined initial part of the period, for which an image signal is stored, or as long as the frequency with which the image signal is read out from a recording medium is higher than a predetermined value, the image signal be stored such that it yields a visible image having as good image quality as possible. Thereafter, the image signal may be stored such that it yields a visible image having slightly bad image quality.

The first and second image filing methods in accordance with the present invention are based on the findings described above. With the first and second image filing methods in accordance with the present invention, within a predetermined period after a compressed image signal obtained from the first signal compression processing was recorded on the first recording medium, or as long as the frequency with which the compressed image signal is read from the first recording medium is higher than the predetermined value, the image signal can be stored which has been compressed with a small factor of compression and from which a visible image having good image quality can be reproduced. After the aforesaid predetermined period has elapsed or after the aforesaid frequency has become lower than the predetermined value, only the image signal is stored which has been compressed with a large factor of compression. Therefore, as long as the image signal is frequently read out from the first recording medium and a visible image having good image quality is to be reproduced from the image signal it is possible to reproduce visible image having good image quality each time the image signal is read out from the first recording medium. Thereafter, only the image signal which has been compressed markedly and therefore the amount of which is very small is stored for a longer period of time. Accordingly, with the first and second image filing methods in accordance with the present invention, the image quality of a visible image reproduced from a compressed image signal can be kept good, and the factor of compression of an image signal can be kept large. Also, image signals can be filed efficiently.

BRIEF DESCRIPTION OF THE DRAWINGS

FIG. 2 is a block diagram showing an image filing apparatus wherein an embodiment of the second image filing method in accordance with the present invention is employed.

DESCRIPTION OF THE PREFERRED EMBODIMENTS

Figure 1:
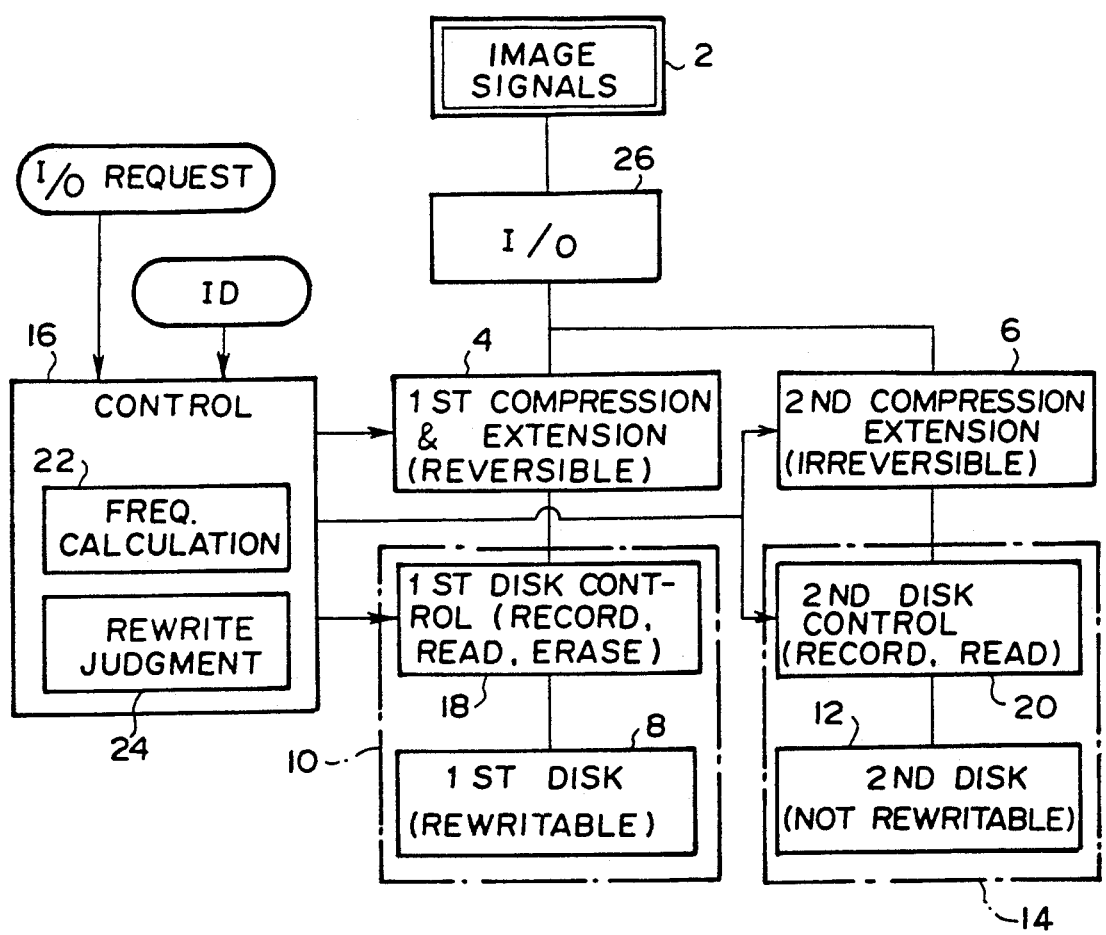
FIG. 1 is a block diagram showing an image filing apparatus wherein an embodiment of the first image filing method in accordance with the present invention is employed.

The present invention will hereinbelow be described in further detail with reference to the accompanying drawings.

With reference to FIG. 1, an image filing apparatus basically comprises a first image signal compression and extension means 4, and a second image signal compression and extension means 6. The first image signal compression and extension means 4 carries out a first signal compression processing with a small factor of compression on an image signal 2. The second image signal compression and extension means 6 carries out a second signal compression processing with a large factor of compression on an image signal. The image filing apparatus also comprises a first image signal recording and erasing means 10, and a second image signal recording means 14. The first image signal recording and erasing means 10 records the compressed image signal, which is obtained from the first image signal compression and extension means 4, on a first optical disk 8 and erases it from the first optical disk 8. The second image signal recording means 14 records a compressed image signal, which is obtained from the second image signal compression and extension means 6, on a second optical disk 12. The image filing apparatus further comprises an image signal control means 16. When a predetermined period has elapsed after the compressed image signal obtained from the first image signal compression and extension means 4 was recorded on the first optical disk 8, or when the frequency with which said compressed image signal is read from the first optical disk 8 has become lower than a predetermined value, the image signal control means 16 issues an instruction for activating an image signal rewriting operation wherein the compressed image signal is read out from the first optical disk 8, extended, and fed into the second image signal compression and extension means 6, and the compressed image signal obtained from the second image signal compression and extension means 6 is recorded o the second optical disk 12.

The image filing apparatus will hereinbelow be described in more detail. The image filing apparatus is constituted so that compressed image signals are recorded on the first optical disk 8 and the second optical disk 12, the recorded image signals are read out therefrom and extended, and the extended image signals are fed out of the apparatus. The first image signal compression and extension means 4 carries out the first signal compression processing with a small factor of compression on the image signal 2 and carries out an image signal extension processing which corresponds to the first signal compression processing. The second image signal compression and extension means 6 carries out the second signal compression processing with a large factor of compression on an image signal and carries out an image signal extension processing which corresponds to the second signal compression processing. The term "small factor of compression" and the term "large factor of compression" as used herein refer to relative levels of the factors of compression which are set in the first image signal compression and extension means 4 and the second image signal compression and extension means 6. In this embodiment, reversible compression algorithms using a small factor of compression are employed in the first image signal compression and extension means 4. Also, irreversible compression algorithms using a large factor of compression are employed in the second image signal compression and extension means 6. As the first signal compression processing and the second signal compression processing, it is possible to employ a redundancy suppression encoding processing, such as a prediction encoding processing or an encoding process based on orthogonal transformation. It is also possible to employ a processing for reducing the number of components of an image signal (i.e. the number of picture elements), a processing for rendering the quantization of an image signal coarse, and other processing for reducing the amount of a digital image signal.

On the first optical disk 8, which serves as a first recording medium, image signals can be rewritten. On the second optical disk 12, which serves as a second recording medium, image signals cannot be rewritten. The first image signal recording and erasing means 10 is constituted of the first optical disk 8 and a first optical disk controller 18, which records a compressed image signal on the first optical disk 8, reads out a compressed image signal therefrom and erases a compressed image signal therefrom. The second image signal recording means 14 is constituted of the second optical disk 12 and a second optical disk controller 20, which records a compressed image signal on the second optical disk 12 and reads out a compressed image signal therefrom.

Also, in this embodiment, an image signal rewriting operation is carried out in accordance with the frequency with which a compressed image signal is read out from the first optical disk 8. Therefore, the image signal control means 16 is provided with a read frequency calculating means 22 and an image signal rewrite judging means 24. The image signal control means 16 receives information about the input and output of an image signal and ID information in order to calculate the frequency, with which a compressed image signal is read out from the first optical disk 8, and to determine whether an image signal rewriting operation is or is not to be carried out.

In the image filing apparatus described above, the image signal 2 is fed into the first image signal compression and extension means 4 via an image signal input and output means 26. The first image signal compression and extension means 4 compresses the image signal 2 with a small factor of compression. The compressed image signal obtained from the first image signal compression and extension means 4 is fed into the first optical disk controller 18 and recorded thereby on the first optical disk 8. When an instruction which requests the output of a compressed image signal is given to the image signal control means 16, the image signal control means 16 controls the first optical disk controller 18 so that it reads out the compressed image signal from the first optical disk 8. The compressed image signal thus read out is extended by the first image signal compression and extension means 4. The extended image signal obtained from the first image signal compression and extension means 4 is fed out through the image signal input and output means 26 to an image reproducing means (not shown), such as a CRT device.

The image signal control mean 16 detects the reading out of the compressed image signal from the first optical disk 8. The read frequency calculating means 22 calculates the frequency with which a compressed image signal is read out from the first optical disk 8. In the image signal rewrite judging means 24, a predetermined frequency is set in advance. When the frequency calculated by the read frequency calculating means 22 becomes lower than the frequency, the image signal rewrite judging means 24 generates a rewrite signal.

In accordance with the rewrite signal, the compressed image signal, the read frequency of which has become lower than the predetermined value, is read out from the first optical disk 8 and extended. The extended image signal is fed into the second image signal compression and extension means 6 and compressed thereby with a large factor of compression. The compressed image signal obtained from the second image signal compression and extension means 6 is fed into the second optical disk controller 20 and recorded on the second optical disk 12. Also, the first optical disk controller 18 erases the compressed image signal, the read frequency of which has become lower than the predetermined value, from the first optical disk 8. Thereafter, when the image signal is to be fed out of the image filing apparatus, it is read out from the second optical disk 12 and fed out via the second optical disk controller 20, the second image signal compression and extension means 6, and the image signal input and output means 26.

The frequency with which a compressed image signal is read out from the first optical disk 8 may be detected from how many times the compressed image signal has been read out within a predetermined period. The number of signal reading operations which have been carried out within the most recent predetermined period may be counted, and the rewrite signal may be generated when the count becomes lower than the set read frequency. Alternatively, frequency with which a compressed image signal is read out from the first optical disk 8 may be detected from whether a new reading operation is or is not carried out within the predetermined period after the most recent reading operation was carried out. When no reading operation is carried out within the predetermined period, the rewrite signal may be generated. The set read frequency may be determined arbitrarily. The set read frequency need not necessarily be the same for all image signals, but may be changed in accordance with the nature and the importance of an image represented by each image signal, for example, the portion of a human body the image of which is represented by each image signal and the importance of the image determined by a doctor.

An embodiment of the second image filing method in accordance with the present invention will be described hereinbelow with reference to FIG. 2.

In this embodiment, an image signal 2 is compressed with a small factor of compression by the first image signal compression and extension means 4, and the compressed image signal is recorded on the first optical disk 8. Also, the image signal 2 is compressed with a large factor of compression by the second image signal compression and extension means 6, and the compressed image signal is recorded on the second optical disk 12. As long as the signal read frequency is higher than a predetermined value, the compressed image signal is read out from the first optical disk 8. When the signal read frequency becomes lower than the predetermined value, the image signal control means 16 generates an erasing signal which instructs the erasing of the compressed image signal, the read frequency of which has become lower than the predetermined value, from the first optical disk 8. In accordance with the erasing signal, the first optical disk controller 18 erases the compressed image signal from the first optical disk 8. Thereafter, when an image corresponding to the erased image signal is to be reproduced, the compressed image signal representing the image is read out from the second optical disk 12.

The image filing apparatus shown in FIG. 2 is different primarily in the filing method, or the like, from the image filing apparatus of FIG. 1. The configuration shown in FIG. 2 is identical with that shown in FIG. 1, excepting that the image signal control means 16 is provided with an image signal erase judging means 28 in lieu of the image signal rewrite judging means 24. Therefore, in FIG. 2, similar elements are numbered with the same reference numerals with respect to FIG. 1. As in the image signal rewrite judging means 24, the predetermined read frequency is set in the image signal erase judging means 28. The image signal erase judging means 28 generates the erasing signal when the read frequency calculated by the read frequency calculating means 22 becomes lower than the predetermined read frequency.

In the embodiment of the first image filing method in accordance with the present invention, the image signal control means 16 controls so that the rewriting is carried out when the read frequency becomes lower than the predetermined value. Also, in the embodiment of the second image filing method in accordance with the present invention, the image signal control means 16 controls so that the erasing is carried out when the read frequency becomes lower than the predetermined value. Alternatively, the image signal control means 16 may control such that a compressed image signal is rewritten or erased when a predetermined period has elapsed after the compressed image signal was recorded on the first optical disk 8. In such cases, the read frequency calculating means 22 is replaced by an elapsed period calculating means. The predetermined period may be determined from, for example, a period after which the read frequency is considered to become lower than the predetermined value. Such a period can be found experimentally. The predetermined period need not necessarily be the same for all image signals, but may be changed in accordance with the nature and the importance of an image represented by each image signal.

I claim:

1. An image filing method comprising the steps of:
   i) subjecting original image signals to a first signal compression processing which is carried out with a small factor of compression,
   ii) recording the compressed image signals, which are obtained from said first signal compression processing, on a first recording medium,
   iii) when a predetermined period has elapsed after a compressed image signal obtained from said first signal compression processing was recorded on said first recording medium, or when the frequency with which said compressed image signal is read from said first recording medium has become lower than a predetermined value, reading out said compressed image signal from said first recording medium,
   iv) subjecting the image signal, which has been read out from said first recording medium, to a second signal compression processing which is carried out with a large factor of compression,
   v) recording the compressed image signal, which is obtained from said second signal compression processing, on a second recording medium, and
   vi) thereafter erasing said compressed image signal, for which said predetermined period has elapsed after it was recorded on said first recording medium or for which said frequency has become lower than said predetermined value, from said first recording medium.

2. A method as defined in claim 1 wherein said first recording medium is a recording medium on which image signals can be rewritten.

3. A method as defined in claim 2 wherein said first recording medium is an optical disk, a magneto-optical disk or a magnetic disk.

4. A method as defined in claim 1 wherein said second recording medium is a recording medium on which image signals cannot be rewritten.

5. A method as defined in claim 4 wherein said second recording medium is an optical disk.

6. A method as defined in claim 1 wherein the compressed image signal, which has been read out from said first recording medium, is extended, and thereafter the image signal obtained from the extension is subjected to said second signal compression processing.

7. An image filing method comprising the steps of:
   i) subjecting original image signals to a first signal compression processing which is carried out with a small factor of compression,
   ii) recording the compressed image signals, which are obtained from said first signal compression processing, on a first recording medium,
   iii) subjecting said original image signals to a second signal compression processing which is carried out with a large factor of compression,
   iv) recording the compressed image signals, which are obtained from said second signal compression processing, on a second recording medium, and
   v) when a predetermined period has elapsed after a compressed image signal obtained from said first signal compression processing was recorded on said first recording medium, or when the frequency with which said compressed image signal is read from said first recording medium has become lower than a predetermined value, erasing said compressed image signal from said first recording medium.

8. A method as defined in claim 7 wherein said first recording medium is a recording medium on which image signals can be rewritten.

9. A method as defined in claim 8 wherein said first recording medium is an optical disk, a magneto-optical disk or a magnetic disk.

10. A method as defined in claim 7 wherein said second recording medium is a recording medium on which image signals cannot be rewritten.

11. A method as defined in claim 10 wherein said second recording medium is an optical disk.

* * * * *